United States Patent
Moeller

(10) Patent No.: US 7,792,750 B2
(45) Date of Patent: Sep. 7, 2010

(54) SUBMITTING REQUESTS WITH DEGREES OF SATISFACTION TO BE USED FOR FUZZY EVALUATION OF RESPONSES

(75) Inventor: Stefan J. Moeller, Laudenbach (DE)

(73) Assignee: SAP AG, Walldorf (DE)

( * ) Notice: Subject to any disclaimer, the term of this patent is extended or adjusted under 35 U.S.C. 154(b) by 1056 days.

(21) Appl. No.: 10/947,470

(22) Filed: Sep. 22, 2004

(65) Prior Publication Data

US 2006/0080209 A1  Apr. 13, 2006

(51) Int. Cl.
    *G06Q 40/00*  (2006.01)
(52) U.S. Cl. ........................ 705/40; 705/37
(58) Field of Classification Search .......... 705/40, 705/1, 37, 35, 26, 39, 67, 80, 14; 283/67, 283/62; 383/127; 707/5
    See application file for complete search history.

(56) References Cited

U.S. PATENT DOCUMENTS

| | | | |
|---|---|---|---|
| 5,191,638 A * | 3/1993 | Wakami et al. | 706/10 |
| 5,675,746 A | 10/1997 | Marshall | |
| 5,794,878 A | 8/1998 | Carpenter et al. | |
| 5,862,223 A * | 1/1999 | Walker et al. | 705/1 |
| 6,012,834 A | 1/2000 | Dueck et al. | |
| 6,073,115 A * | 6/2000 | Marshall | 705/35 |
| 6,098,051 A * | 8/2000 | Lupien et al. | 705/36 R |
| 6,236,977 B1 | 5/2001 | Verba et al. | |
| 7,039,623 B1 * | 5/2006 | Keeley | 706/46 |

OTHER PUBLICATIONS

Strategic Sourcing with mySAP TM Supplier Relationship Management, retrieved Jan. 13, 2005 from http://www.sap.com/solutions/business-suite/srm/pd f/B WP_S ID_Strategic_Sourcing.pd f.*
The Webs Lure for Working Travellers Amon Cohen a Story From the Evening Standard Aug. 3, 1999 Evening Standard, p. 64 Mar. 8, 1999, Journal Code: FES Language: English Record Type: Fulltext.*
*Strategic Sourcing with mySAP™ Supplier Relationship Management*, retrieved Jan. 13, 2005 from http://www.sap.com/solutions/business-suite/srm/pdf/BWP_SID_Strategic_Sourcing.pdf.

* cited by examiner

*Primary Examiner*—Mary Cheung
*Assistant Examiner*—John H Holly
(74) *Attorney, Agent, or Firm*—Kenyon & Kenyon LLP

(57) ABSTRACT

The present invention provides a system and method for providing requests using linguistic terms to describe importance and degrees of satisfaction. For example, a user may submit a bid invitation for items and use linguistic terms to describe the importance of each item and of attributes of the items. Linguistic terms may also be used to describe degrees of satisfaction with possible values of attributes of the items. The system and method of the present invention use fuzzy logic to evaluate the offers. The evaluation provides a degree of satisfaction based on the information provided by the user.

14 Claims, 14 Drawing Sheets

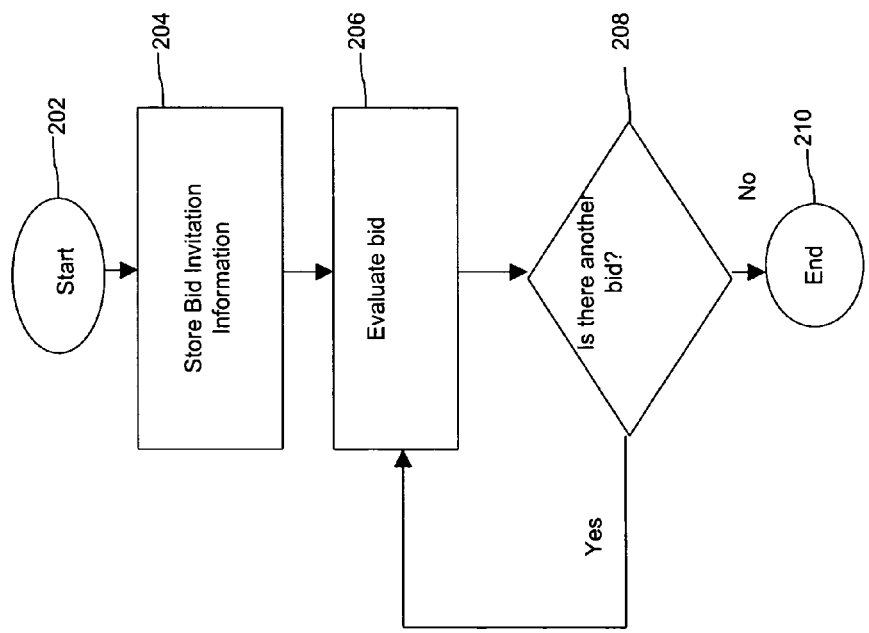

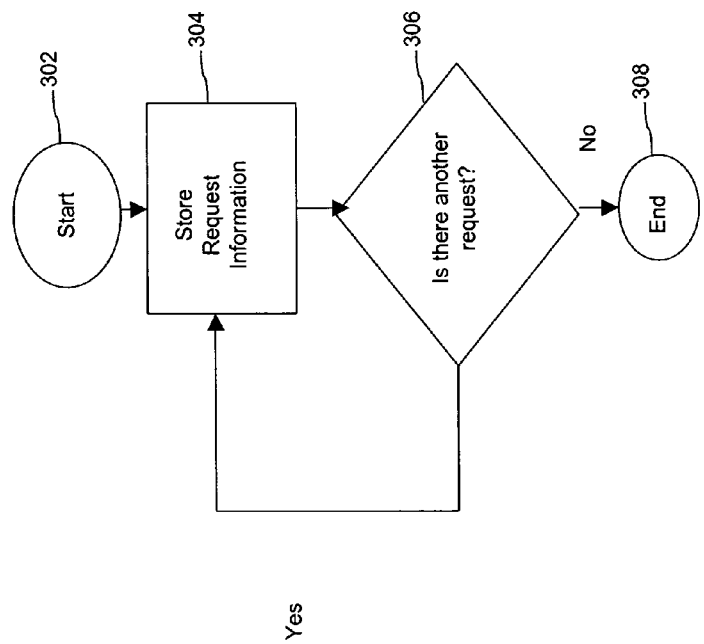

Importance

| Fuzzy Variable | Fuzzy Value |
|---|---|
| Not Important | 0 |
| Not So Important | 0.25 |
| Medium | 0.5 |
| Important | 0.75 |
| Very Important | 1 |

Fig. 8

Excellence

| Fuzzy Variable | Fuzzy Value |
|---|---|
| Very Bad | -1 |
| Bad | -0.5 |
| Medium | 0 |
| Good | 0.5 |
| Very Good | 1 |

Fig. 9

Clothing Bid Example

Fig. 10b

SUBMITTING REQUESTS WITH DEGREES OF SATISFACTION TO BE USED FOR FUZZY EVALUATION OF RESPONSES

BACKGROUND

Information and computer technology comprise an essential component for modern business operations. The utility of computer technology has been enhanced by the coupling of computers with information networks such as the Internet and World Wide Web ("WWW"). Companies use computer facilities to engage in marketing campaigns using asynchronous communications such as e-mail, letters and facsimiles (FAXes).

Successful business operations in the global marketplace require a systematic approach for formulating and optimizing global sourcing strategy. For example, strategic sourcing capabilities allow purchasers to negotiate the best terms and conditions by inviting qualified bidders to submit their proposed bids and then evaluating these bids.

To automatically evaluate proposed bids, the purchaser enters information into a bidding system about the items that are desired. The purchaser may also enter quantitative weight numbers associated with the item or attributes of the item indicating the importance of the item or attribute. The purchaser may need to ensure that the sum of the quantitative weight numbers are equal to 100 and may need to enter an algorithm. When a bid is received, the bidding system uses this information to calculate a value indicating the degree that the bid matches the purchaser's request. The computation uses a linear algorithm.

A problem with this system is that weight numbers are not intuitive. The purchaser is forced to add a lot of quantitative weight numbers although the purchaser may be accustomed to thinking of the item as important or not important or characteristics of the item as good or not so good. If the purchaser wants to change a weight number, another weight number might also need to be changed. Additionally, the user might also choose the linear function to be used in the computation. Overall, the system is very inflexible and difficult to use, which may cause poor results.

BRIEF DESCRIPTION OF THE DRAWINGS

FIG. 2b shows the operation of a evaluation engine to generate an automatic bid analysis according to one embodiment of the invention.

FIG. 3 shows the operation performed to process a bid invitation according to one embodiment of the invention.

FIG. 8 shows importance fuzzy values associated with importance fuzzy variables.

FIG. 9 shows degree of satisfaction fuzzy values associated with degree of satisfaction fuzzy variables.

FIG. 10b illustrates an example of a clothing bid according to one embodiment of the invention.

DETAILED DESCRIPTION

The present invention provides a system and method for using fuzzy logic to evaluate offers and provide a quantitative value reflecting a degree of satisfaction. According to one embodiment of the present invention, a user submits a request and receives in response one or more offers to fulfill this request. Quantitative values may be generated that provide a degree of satisfaction of the offers. The degrees of satisfaction are obtained using information that the user entered, for example, when submitting the request. This degree of satisfaction may also be referred to as excellence herein. However, the use of the term excellence is not an indication that the user is satisfied or believes that the offer is excellent. Fuzzy logic is used in the automated process so that the system behaves like the user thinks. A user may interface with an evaluation engine using linguistic terms that are familiar to the user.

For example, fuzzy logic may be used in a bidding system to indicate a level of satisfaction of a bid. Bidding systems may be used by prospective purchasers, which are also referred to as purchasers, to obtain bids for items that the prospective purchaser wishes to purchase. The prospective purchaser can submit a bid invitation specifying desired items. A prospective purchaser submits a bid invitation that describes items using linguistic terms that are familiar to the purchaser rather than numeric weights. For example, the prospective purchaser may describe an item as important or very important. Additionally, a prospective purchaser may specify a degree of satisfaction of a value of an attribute of an item. For example, if a prospective purchaser desires a yellow jacket, the prospective purchaser will specify for the attribute color a degree of satisfaction of very good for the attribute value of yellow of the jacket. The system does not require that the prospective purchaser ensure that the sum of the weighted numbers is equal to one and does not require specification of an algorithm to be used for evaluation. The system then accepts bids in response to the bid invitation and automatically evaluates the bids using fuzzy logic to analyze the information provided by the prospective purchaser.

The fuzzy logic algorithm described in this document may also be used in a system used for evaluating an employee survey. An employer may enter a survey in a system and use linguistic terms to provide degrees of satisfaction with various possible employee responses. Employees may then take the survey providing their responses. The system may then compute a degree of satisfaction with the survey based on the preferences specified by the employer.

Figure 1:
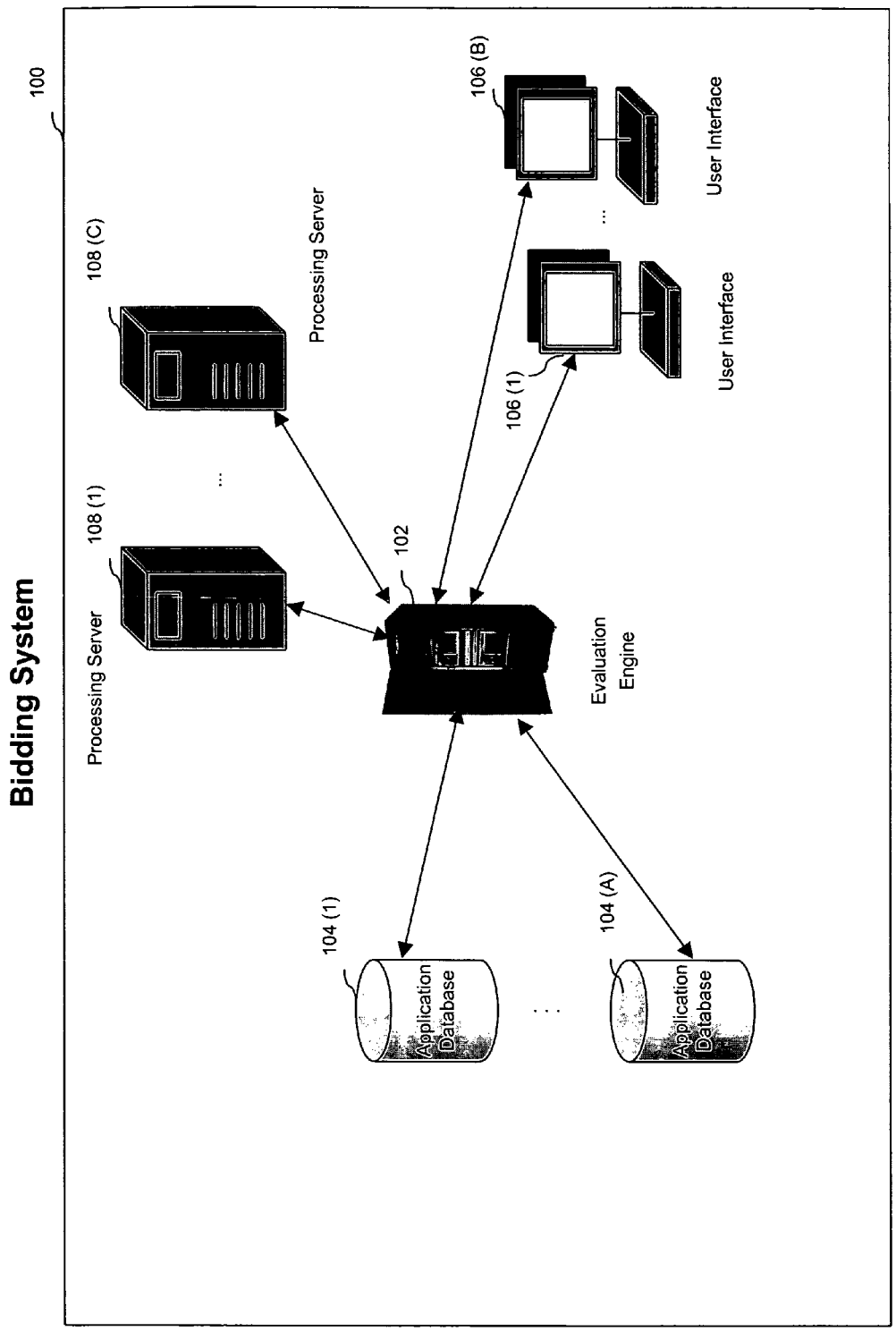
FIG. 1 shows a bidding system according to one embodiment of the invention

FIG. 1 shows a bidding system 100 according to one embodiment of the invention. Bidding system 100 comprises evaluation engine 102, application databases 104(1)-104(A), user interfaces 106(1)-106(B) and processing servers 108(1)-108(C). Evaluation engine 102 is connected to application databases 104(1)-104(A), user interfaces 106(1)-106(B), and processing servers 108 (1)-108(C).

Evaluation engine 102 may evaluate bids that are received in response to bid invitations. Evaluation engine 102 may first process bid invitations submitted by prospective purchasers. Evaluation engine 102 receives bid invitations that describe desired items in linguistic terms. Prospective purchasers are not required to enter a numerical weight factor and then submit a mathematical equation to be used to evaluate a bid. Evaluation engine 102 uses fuzzy logic to automatically evaluate bids that are received in response to the bid invitation. Because bid evaluation is automatic, a prospective purchaser can rely on the results of the automatic bid evaluation to make a purchasing decision and need not go through the grueling process of manually evaluating many bids. Evaluation engine 102 is described in further detail below.

Each of application systems 104(1)-104(A) is a processing system, which can include one or more programmable processors and one or more machine-readable mediums. An application is any set of electronic data including electronic data stored in one or more files or in a portion of a file that is processed to perform a specific function typically for a user. According to one embodiment of the invention, application databases 104(1)-104(B) store applications that provide supplier relationship management. Supplier relationship management provides a systematic approach for global sourcing strategy that allows users to evaluate multiple suppliers of goods to identify those that can satisfy the user's needs. Supplier relationship management may include management of contracts, request for quotations (RFQs), auctions, bidding, as well as other aspects of purchasing goods. Applications are typically implemented as middleware (e.g., application client and server). Evaluation engine 102 is connected to application databases 104(1)-104(B) to provide bidding information to the supplier relationship management applications and receive information from these application to use in the bidding process.

User interfaces 106(1)-106(C) are user interaction devices, which as used herein are devices that can be used to provide interaction with a user. User interfaces 106(1)-106(C) allow prospective vendors to transmit bids in response to bid invitations. Examples of user interaction devices include a client computer having a graphical user interface (GUI), a Web browser, a phone, cellular phone, or a personal data assistant. Such devices may comprise an output device (e.g., liquid crystal display (LCD), cathode ray tube (CRT), or ear-piece) for displaying information to a user and an input device (e.g., keyboard, mouse, trackball, keypad) by which the user can provide input to the computer. Under interaction devices may provide to the user any form of sensory feedback (e.g., visual feedback, auditory feedback, or tactile feedback) and input from the user can be received in any form including acoustic, speech, or tactile input. User interfaces 106(1)-106(C) are typically front-end devices.

Processing servers 108(1)-108(C) are software and/or hardware that perform a specific service or function. Processing servers 108(1)-108(C) operate with any client software that requests a specific service and may assist in processing supplier relationship management services.

The components of bidding system 100 can be interconnected by any form of medium or digital data communication, including a local area network, and a wide area network. Bidding system 100 can be implemented in a computing system that includes any combination of one or more back-end components (e.g., as a data servers), middleware components (e.g., application servers), or front-end components (user interfaces). In an alternate embodiment of the invention, bidding system 100 is a single processing system.

Figure 2A:
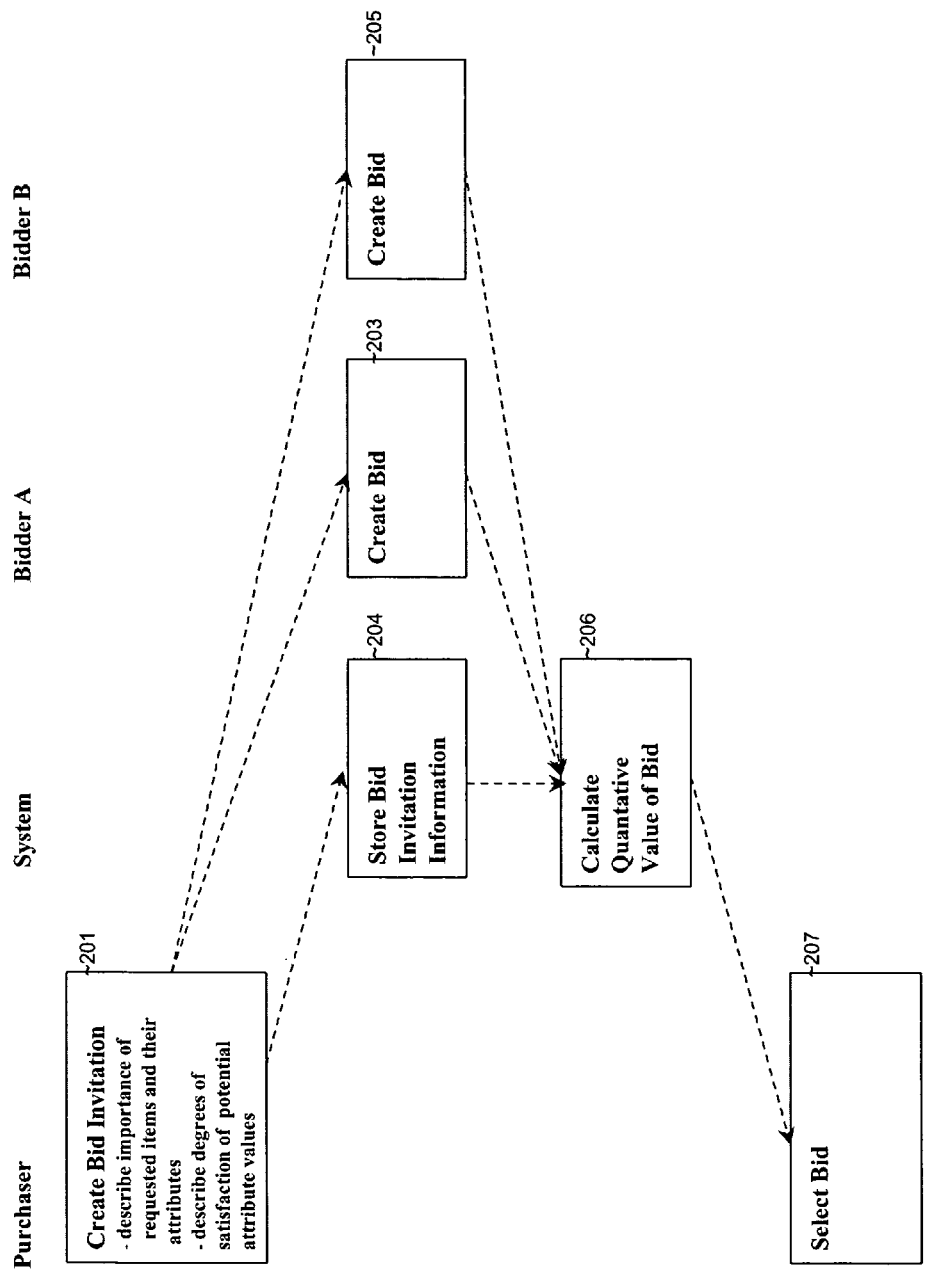
FIG. 2a shows the operation of a bidding system according to one embodiment of the invention.

FIG. 2a shows operation of a bidding system 100 according to an embodiment of the present invention. In step 201, a prospective purchaser creates a bid invitation that may describe the importance of requested items and their attributes. The prospective purchaser may use user interface 106 to create the bid invitation. User interface 106 may operate independently to allow the user to create the bid invitation. Later the bid invitation may be downloaded to evaluation engine 102. In an alternate embodiment of the invention, a user may use user interface 106 to log onto a Internet Web Site or to interface with some other processor and/or database to create the bid invitation. While creating the bid invitation, the prospective purchaser may also describe the degree of satisfaction of potential attribute values.

In step 204, the system stores bid invitation information. In step 203, bidder A submits a bid in response to the bid invitation using, for example, user interface 106(2). In step 205, bidder B submits a bid in response to the bid invitation, using, for example, user interface 106(B).

In step 206, the system calculates quantitative values of the bids.

In step 207, the prospective purchaser selects a bid using, for example, user interface 106(1).

FIG. 2b shows the operation of evaluation engine 102 to generate an automatic bid analysis according to one embodiment of the invention. In step 204, evaluation engine 102 stores bid invitation information received from a prospective purchaser. The prospective purchaser enters information about its requests, which are items that the prospective purchaser might like to purchase. Requests need not be actually required by a prospective purchaser and may include items that the prospective purchaser believes are unimportant. A prospective purchaser may specify the importance of an item, and additionally, the desirability of characteristics of the item, such as a low price. The prospective purchaser's information may be received by evaluation engine 102. Evaluation engine 102 may store this data internally or within application database 104. In an alternate embodiment, a prospective purchaser may use a user interface that is connected to one or more of processing servers 108(1)-108(C) for processing of bid invitation information.

In step 206, evaluation engine 102 evaluates a bid. Prospective vendors submit bids in response to a bid invitation. In step 206, one of these bids is evaluated by evaluation engine 102. Evaluation engine 102 evaluates bids automatically using fuzzy logic. In an alternate embodiment of the invention, evaluation engine 102 does not perform step 204. In this alternate embodiment, evaluation engine 102 receives bid invitation information from another device and begins processing with step 206 to evaluate the bid.

In step 208, evaluation engine 102 determines whether another bid should be processed. If an additional bid is available, processing returns to step 206. Step 206 can be repeated as often as needed to evaluate bids submitted by prospective vendors.

FIG. 3 shows the operation of performed to process a bid invitation according to one embodiment of the invention. This operation may be performed by evaluation engine 102 or user interface 106. In step 304, request information entered by a prospective purchaser is stored. Step 304 will be described in further detail with respect to FIGS. 4 and 5. In step 306, a determination is made whether there is another request to be processed. If there is another request, processing returns to step 304.

Figure 4:
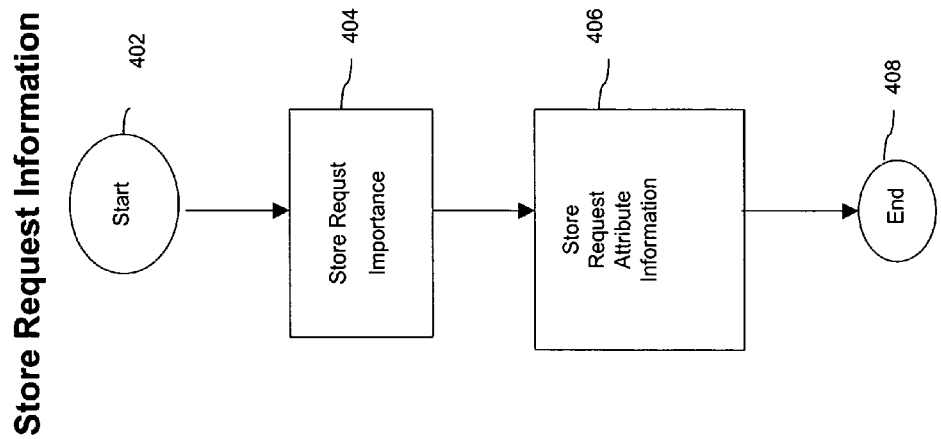
FIG. 4 shows the operation performed to store request information according to one embodiment of the invention.

FIG. 4 shows the operation performed to store request information according to one embodiment of the invention. This operation may be performed by evaluation engine 102 or user interface 106. In step 404, request importance is stored. When a prospective purchaser submits a bid invitation, the prospective purchaser may enter an importance of a request.

The importance may be used to signify to what degree the request is needed. The prospective purchaser selects a fuzzy variable, which is a linguistic expression of the importance of the item to the purchaser. Exemplary fuzzy variables include not important, not so important, medium, important, and very important. These fuzzy variables are shown in FIG. 8. The prospective purchaser may be able to customize the fuzzy variables that can be selected and is not limited to using five fuzzy variables.

In step 406, request attribute information is stored. When a prospective purchaser submits a bid invitation, the prospective purchaser may specify attributes for a request. For example, if a prospective purchaser wishes to purchase a jacket, the purchaser could specify a price that the prospective purchaser is willing to pay for the jacket and a color of the jacket that the prospective purchaser would like.

Figure 5:
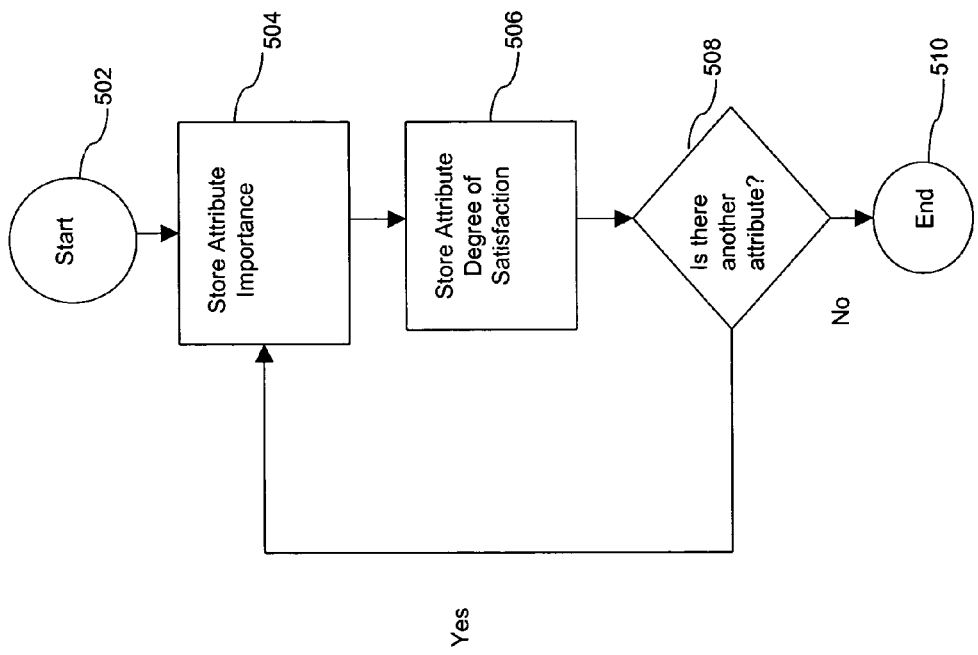
FIG. 5 shows the operation performed to store request attribute information according to one embodiment of the invention.

FIG. 5 shows the operation performed to store request attribute information according to one embodiment of the invention. This processing may be performed by evaluation engine 102 or user interface 106. In step 504, the attribute importance is stored. When a prospective purchaser submits a bid invitation, the prospective purchaser may specify an importance associated with each of these attributes of the request. The prospective purchaser selects a fuzzy variable. By way of example, if it is important to a prospective purchaser to pay only a certain price for the jacket, the prospective purchaser can specify that the price attribute is important. If the prospective purchaser is not too concerned about the color of the jacket, the prospective purchaser can specify medium for the color.

In step 506, evaluation engine 102 stores the attribute's degree of satisfaction. When a prospective purchaser submits a bid invitation, the prospective purchaser may specify a degree of satisfaction associated with each of the potential attribute values of these attributes of the request. The prospective purchaser selects a degree of satisfaction fuzzy variable for these possible attribute values that an offered item might have. A degree of satisfaction fuzzy variable is a linguistic expression of the desirability of the attribute to the purchaser. Exemplary degree of satisfaction fuzzy variables include very bad, bad, medium, good, and very good. These examples are illustrated in FIG. 9. A user may customize these fuzzy variables and is not limited to using five possible fuzzy variables. An example of a bid is provided in FIG. 10. As illustrated by this example, if a prospective purchaser believes that $100 is a very good price for a jacket, the prospective purchaser can specify very good for the value of $100 for the price of the jacket. If a prospective purchaser believes that $200 is a very bad price for the jacket, the prospective purchaser can specify very bad for the value of $200 for the price of the jacket. Attributes may be discrete or continuous. A discrete attribute is an attribute such as color that matches an attribute that was specified by the prospective purchaser. For example, a purchaser may specify that a black jacket is very good and a white jacket is bad. When the bidder submits a bid, the bidder will specify a color of the jacket e.g., either black or white. The color of the jacket correlates directly to one of the options selected by the prospective purchaser e.g., black or white. An attribute may also be continuous. For example, price is a continuous attribute. A bidder may specify that the jacket costs $150. If the prospective purchaser specified that $100 is a very good price and $200 is a very bad price, $150 falls somewhere between the options specified by the prospective purchaser i.e., it does not directly correlate to either $100 or $200. FIG. 11 illustrates establishing fuzzy variable settings according to one embodiment of the invention. In this example, the prospective purchaser specified that $100 is a very good price for a jacket and $200 is a very bad price for a jacket. This is shown by highlighting the triangle corresponding to 1 (very good) and −1 (very bad). The system may automatically calculate values for good, medium, and bad, which are $125, $150, and $175 respectively. As an additional example, a prospective purchaser may enter a degree of satisfaction for three attribute values for price, very good for $100, medium for $130, and very bad for $200. The system will then calculate the remaining two triangles, which in this example is $115 for good and $165 for bad. Further, a prospective purchaser can specify that multiple attribute values have the same degree of satisfaction. For example, if a prospective purchaser wishes to have items delivered on Monday, the prospective purchaser may enter very good for the delivery dates Aug. 16, 2004 and Aug. 23, 2004.

In step 508, evaluation engine 102 determines whether there is another attribute. If there is another attribute, processing returns to step 504.

Figure 6:
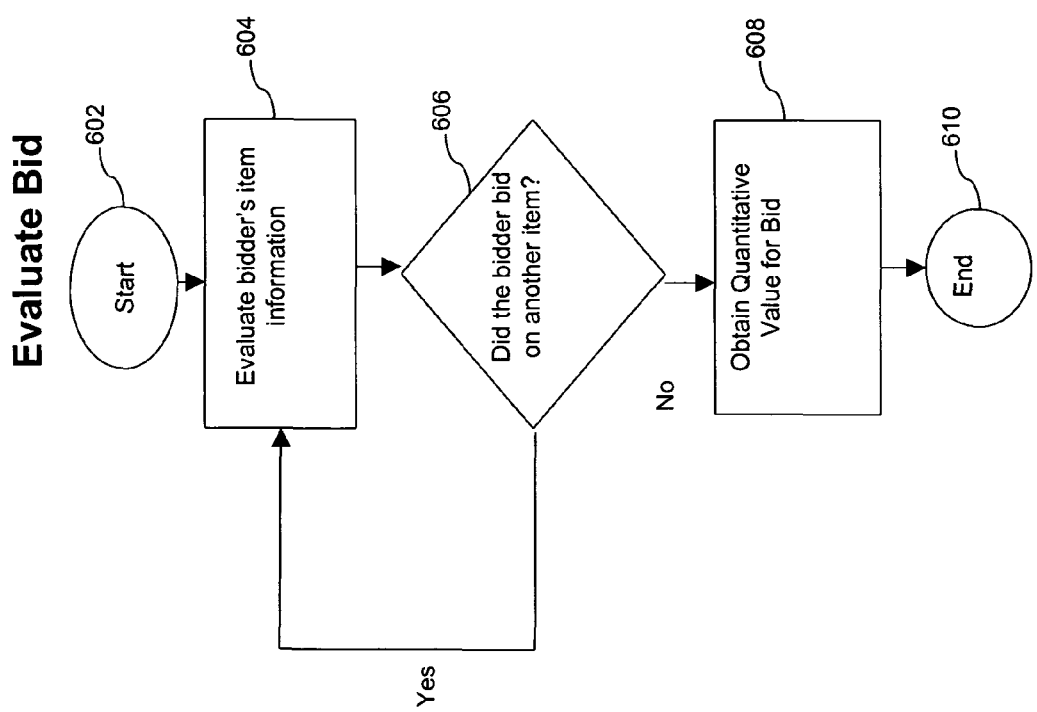
FIG. 6 depicts the operation of the evaluation engine to evaluate a bid according to one embodiment of the invention.

FIG. 6 depicts the operation of evaluation engine 102 to evaluate a bid according to one embodiment of the invention. Prospective vendors (or bidders) submit bids in response to the bid invitation. The bidder offers items for purchase by the prospective purchaser and specifies the characteristics or attributes of these items including the price. In step 604, evaluation engine 102 evaluates the bidder's item information. Evaluation engine 102 uses fuzzy logic to evaluate the bid. Fuzzy logic is a theory used to manage a kind of uncertainty. Using fuzzy logic techniques, evaluation engine 102 defuzzifies the importance of the item. Evaluation engine 102 directly defuzzifies the importance of the item by retrieving the fuzzy value associated with the importance fuzzy variable specified by the prospective purchaser. FIG. 8 shows fuzzy values associated with importance fuzzy variables. FIG. 10 illustrates an example of a clothing bid according to one embodiment of the invention. In the example illustrated in FIG. 10, the prospective purchaser enters a value of very important for jacket and medium important for trousers. The system directly defuzzifies the jacket importance to be equal to 1.0 and trouser importance to be equal to 0.5. The evaluation of a bidder's item information will be described in further detail with respect to FIGS. 7 through 14.

In step 606, evaluation engine 102 determines whether the bidder bid on another item. If the bidder bid on another item, processing returns to step 604. If the bidder did not bid on another item, processing proceeds to step 608.

In step 608, evaluation engine 102 obtains a quantitative degree of satisfaction value for the bid. Step 608 will be described in further detail with respect to FIGS. 10-12.

Figure 7:
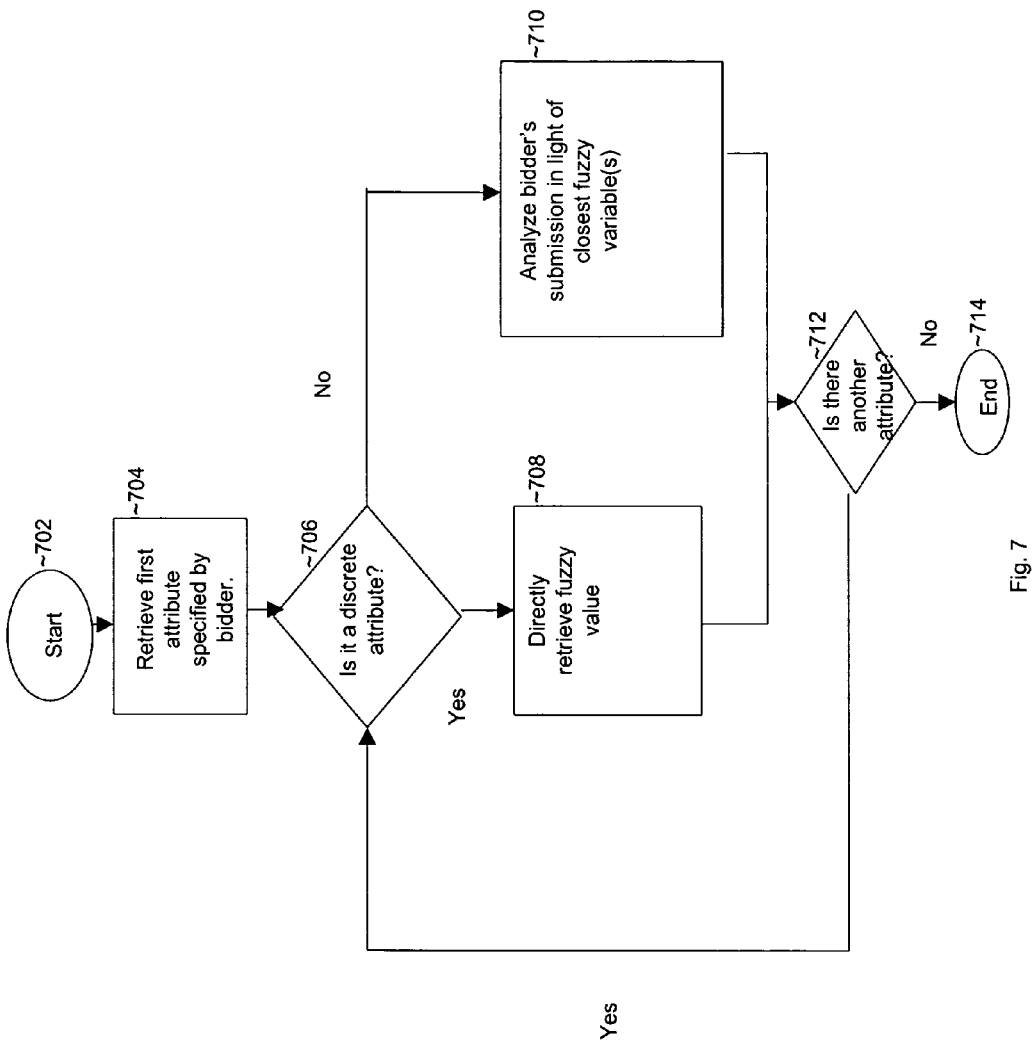
FIG. 7 depicts the operation of the evaluation engine to evaluate a bidder's item information according to one embodiment of the invention.

FIG. 7 depicts the operation of evaluation engine 102 to evaluate a bidder's item information according to one embodiment of the invention. In step 704, evaluation engine 102 retrieves the first attribute of the item specified by the bidder. Evaluation engine 102 uses fuzzy logic to evaluate the attribute. Using fuzzy logic techniques, evaluation engine 102 can directly retrieve the fuzzy value associated with the importance fuzzy variable specified by the prospective purchaser. These values are the same as those used for the evaluating the importance of the item and are shown in FIG. 8. In the example shown in FIG. 10, the prospective purchaser entered a value of important for the price of a jacket. The value of 0.75 can be directly retrieved. As shown in FIG. 10, the importance of the color of the jacket, the importance of the price of the trousers, and the importance of the color of the trousers can also be directly retrieved Returning to FIG. 7, in step 706, evaluation engine 102 determines whether the retrieved attribute is a discrete attribute. As was described with respect to FIG. 5, attributes may be discrete or continuous. If an attribute is discrete, the value of the attribute can be directly retrieved. If an attribute is continuous, the attribute may fall somewhere between two fuzzy variables and contribution may be considered. If the attribute is a discrete attribute, processing proceeds to step 708. If the attribute is a continuous attribute, processing proceeds to step 710.

In step 708, evaluation engine 102 can directly retrieve the fuzzy value associated with the degree of satisfaction fuzzy variable specified by the prospective purchaser. FIG. 9 shows fuzzy values associated with degree of satisfaction fuzzy variables. The purchaser enters a fuzzy variable of very good for a black jacket. When a bidder offers a black jacket, the system can directly retrieve the value of 1.0 for very good since the prospective purchaser specified that a black jacket is very good. When step 708 is complete, processing continues to step 712.

In step 710, evaluation engine 102 analyzes a bidder's submission in light of the fuzzy variables most closely correspond to the bidder's submission. For example, if a bidder submits a bid for a jacket that costs $112.50, as can be seen from FIG. 11, the closest attribute values provided by the prospective purchaser are very good ($100) and good ($125). The system will then need to consider the contribution of the submission, $112.50, to these attribute values. Since the submission is directly in the middle of $100 and $125, the contribution to both very good and good is 50%. If, on the other hand, the submission was $180, the contribution would not be 50%. The two closest attribute values to $180 are very bad ($200) and bad ($175). The contribution to very bad is 20% and the contribution to bad is 80%.

Returning to FIG. 7, in step 712 evaluation engine 102 determines whether there is another attribute. If there is another attribute, processing returns to step 706.

Figure 10A:
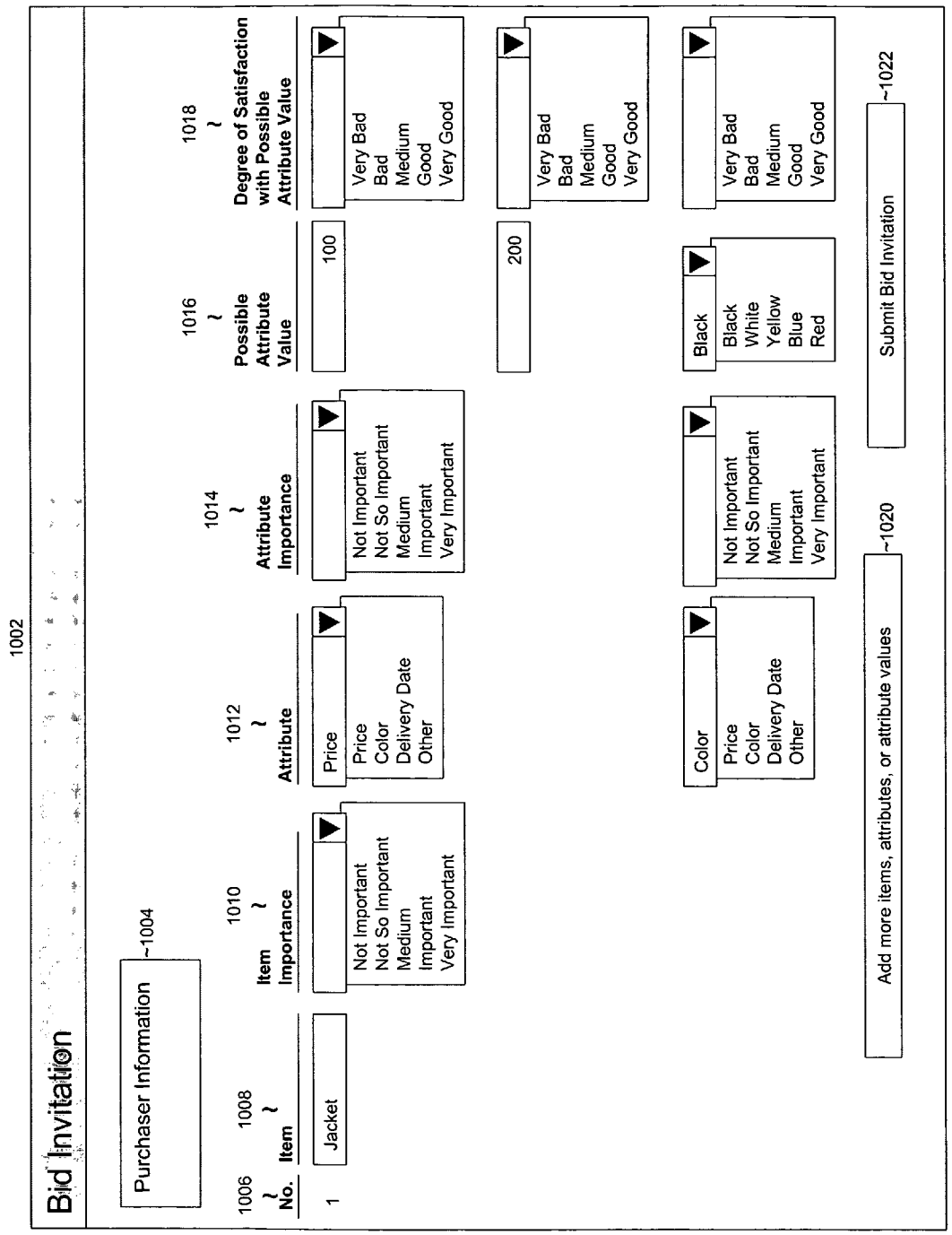
FIG. 10a illustrates an example of a bid invitation graphical user interface according to one embodiment of the invention.
Figure 10B:
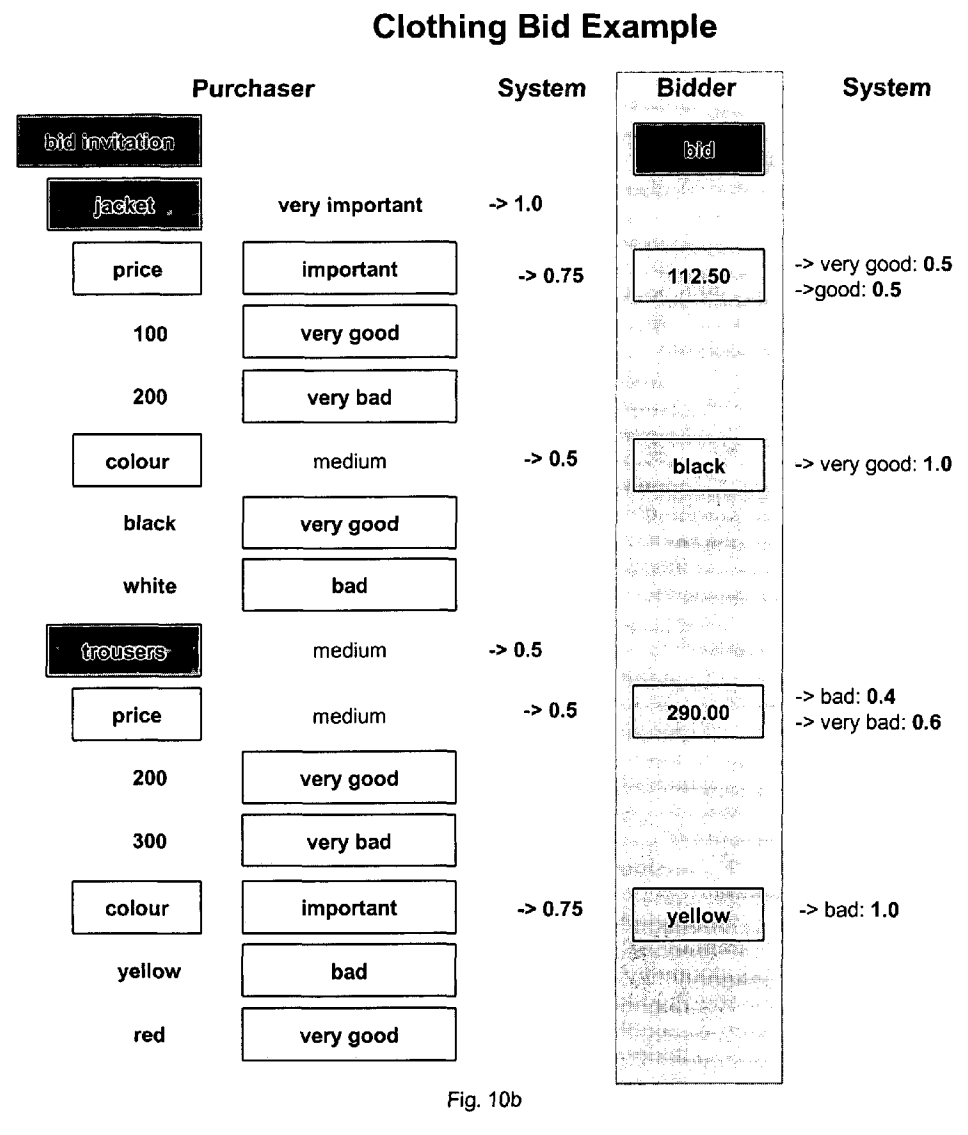
Figure 11:
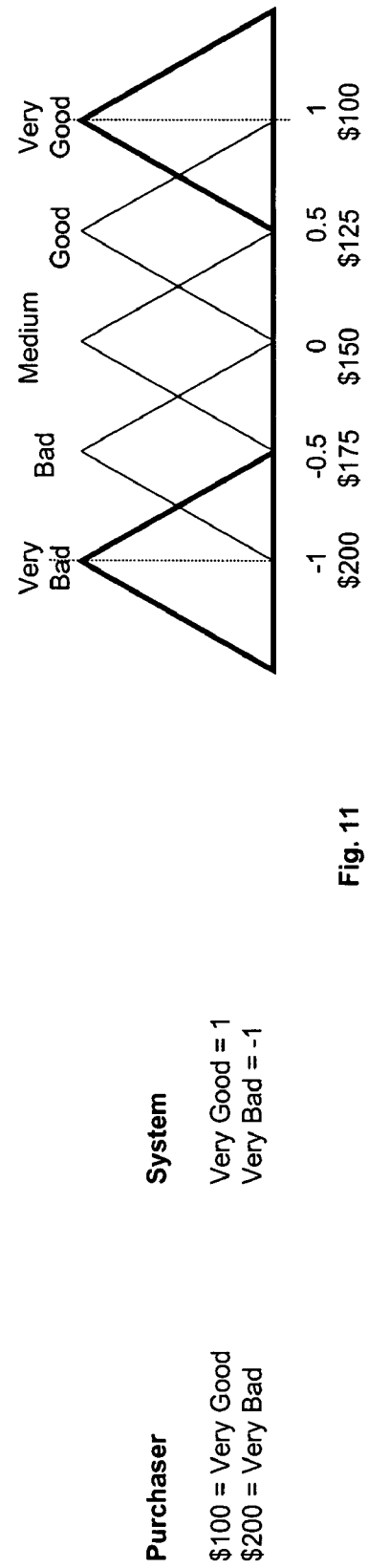
FIG. 11 illustrates establishing fuzzy variable settings according to one embodiment of the invention.

FIG. 10a illustrates bid invitation graphical user interface 1002 according to one embodiment of the invention. Bid invitation graphical user interface 1002 may be used by a prospective purchaser to list items that are desired and preferences with attributes of those items. Bid invitation graphical user interface 1002 may comprise purchaser information field 1004, item number field 1006, item control 1008, item importance control 1010, attribute control 1012, attribute importance control 1014, possible attribute value control 1016, degree of satisfaction control 1018, add button 1020 and submit button 1022.

Purchaser information field 1004 may be used to provide general information about the prospective purchaser, e.g., company name and address. Item number field 1006 may be used to identify a particular item.

Item control 1008 may be used by a prospective purchaser to provide a brief description of the item that is desired. Exemplary descriptions include "jacket" or "trousers." Item control 1008 may allow a prospective purchaser to enter any item. Item control 1008 may provide some filtering e.g., suggested spellings.

Item importance control 1010 may be a drop down menu that lists the importance fuzzy variables, such as those described with respect to FIG. 8, that a prospective purchaser can chose from. Item importance control 1010 may provide a prospective purchaser with linguistic expressions of degrees of importance that the prospective purchase can easily understand and chose from. Specifying a degree of importance allows this degree to be reflected in the evaluation that will later be returned to the prospective purchaser so that, for example, the prospective purchaser does not turn down a bid due to items that the purchaser believes are not important.

Attribute control 1012 may be used by a prospective purchaser to describe an attribute of a desired item. Attribute control 1012 may be a drop-down menu that allows a user to specify from a number of common attributes or select other. Attribute control 1012 may also allow a user to select override so that the selection menu can be overridden and the prospective purchaser can type in any attribute. In another embodiment of the invention, attribute control 1012 may be a field that allows a user to type in any attribute and may not include a drop down menu. Attribute control 1012 may provide some filtering e.g., check spelling.

Attribute importance control 1014 may be used by a prospective purchaser to describe an importance of an attribute. Attribute importance control 1014 may be a drop-down menu that lists the importance fuzzy variables that a prospective purchaser can chose from. These importance fuzzy variables may be the same or different linguistic expressions of degrees of importance from those provided by item importance control 1010. Specifying a degree of importance of an attribute allows the bid evaluation to reflect this importance so that, for example, the prospective purchaser does not turn down an item due to an attribute that the prospective purchaser believes is not important.

Possible attribute value control 1016 may be used by a purchaser to indicate a possible value of the attribute provided using attribute control 1012. The prospective purchaser can indicate possible attribute values of attributes that the prospective purchaser believes may be submitted in bids, e.g. a price of $100 or a color of black. Possible attribute value control 1016 may be keyed off of attribute 1012. For example, if the attribute is a discrete attribute, possible attribute value control 1016 may provide a prospective purchaser with selections that the prospective purchaser can chose from. If the attribute is a continuous attribute, possible attribute value control 1016 may allow the user to type in any attribute value. In an alternate embodiment of the invention, possible attribute value control 1016 may allow a user to type in any value of an attribute regardless of whether the attribute is a discrete attribute or a continuous attribute.

Degree of satisfaction control 1018 may be a drop down menu that lists the degree of satisfaction fuzzy variables, such as those described with respect to FIG. 9, that a prospective purchaser can chose from. Degree of satisfaction control 1018 may provide a prospective purchaser with linguistic expressions of degrees of satisfaction that the prospective purchase can easily understand and chose from. By specifying degrees of satisfaction, a prospective purchaser identifies what characteristics of an item that the prospective purchaser desires and characteristics that the prospective purchase does not want so that the system can automatically evaluate incoming bids and let the prospective purchaser know what bid or bids best meet the prospective purchaser's preferences.

Add button 1020 may be used by a prospective purchaser to add more items, attributes or attribute values to the bid invitation. The prospective purchaser selects add button 1020 and then enters whatever information the prospective purchaser wishes in the appropriate fields. Submit button 1022 may be used by a prospective purchaser to submit the bid invitation. Once submitted, the bid invitation may be stored on user interface 106 or another purchaser system for eventual download to evaluation engine 102. In an alternate embodiment of the invention, the bid invitation is stored immediately on evaluation engine 102.

Figure 12:
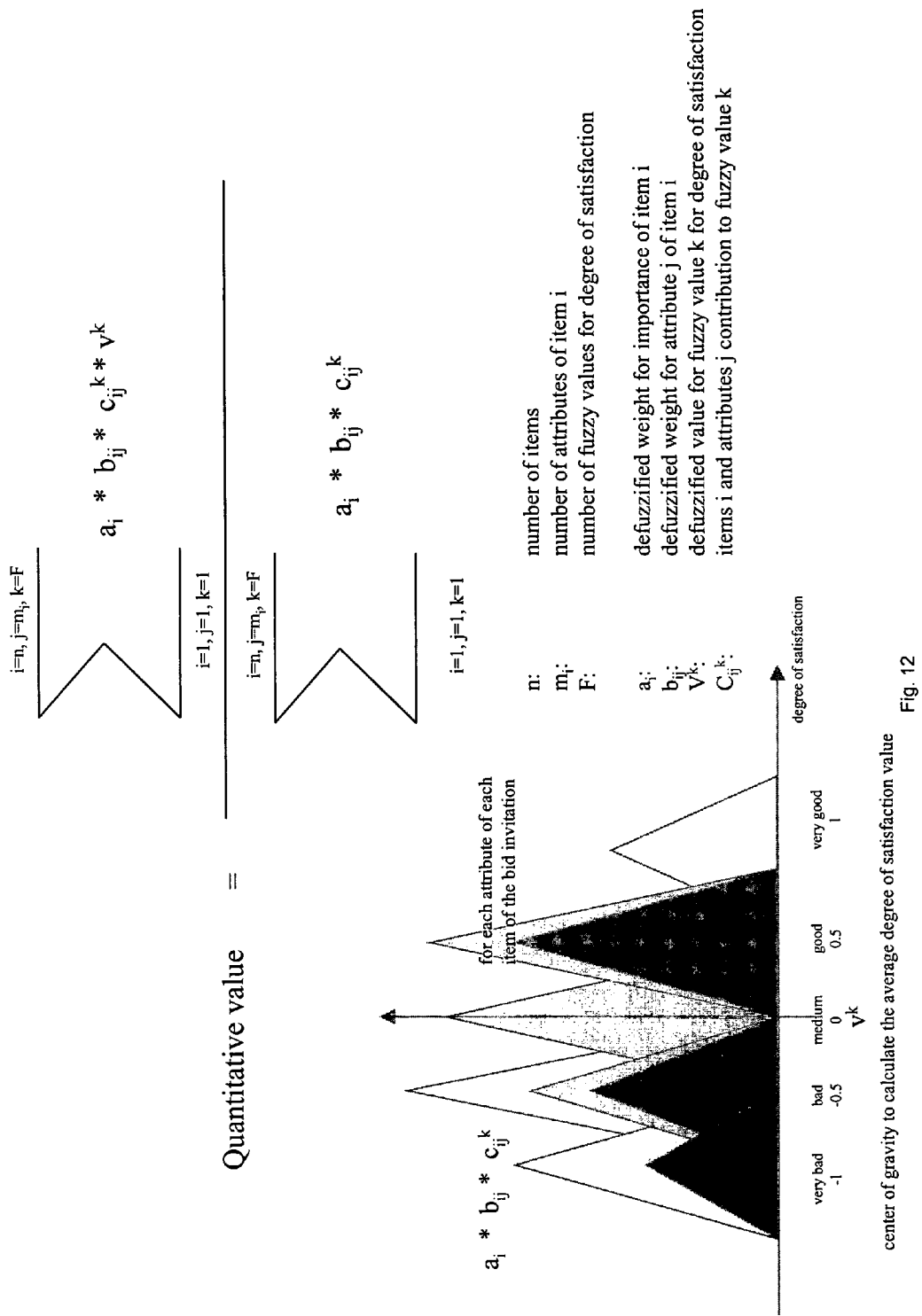
FIG. 12 illustrates the formula for calculating degree of satisfaction according to one embodiment of the invention.

FIG. 12 illustrates the formula for calculating degree of satisfaction according to one embodiment of the invention. As was explained with respect to FIG. 6, after evaluation engine 102 evaluates the attributes of the items in the bid, in step 608, evaluation engine 102 obtains a quantitative degree of satisfaction value for the bid. The quantitative degree of satisfaction value of the bid reflects the prospective purchaser's satisfaction with the bid, based on the data entered by the prospective purchaser. FIG. 12 shows the formula for computing this quantitative degree of satisfaction value. The quantitative degree of satisfaction value of the bid may be computed using the center of gravity approach. The center of gravity approach is a weighted method.

The center of gravity approach is computed using the formula that is illustrated in FIG. 12. In the clothing example illustrated in FIG. 10, considering the jacket, the variable $a_i$, which is the importance of the item, is very important or 1.0. The variable $b_i$ is the importance for the attributed, for example the price, is important or 0.75. If the bidder submits a bid with a price of $112.50, as can be seen from FIG. 11b, there is contribution to good ($125) and very good ($100). In fact the contribution to both good and very good is 50%. The values (v) for good and very good are 0.5 and 1.0 respectively. Therefore, $a*b*c*v$ is equal to $(1.0)(0.75)(0.5)(0.5)+(1.0)(0.75)(0.5)(1.0)$ and $a*b*c$ is equal to $(1.0)(0.75)(0.5)+(1.0)(0.75)(0.5)$. If the bid included only a jacket with only the attribute of price specified, the resulting degree of satisfaction value is 0.75. The contribution need not always be 50%. For example, if the bidder had entered a price of $180, there would be contribution to very bad ($200) and bad ($175). The contribution to very bad would be 20% and the contribution to bad would be 80%. In this case, $a*b*c*v$ is equal to $(1.0)(0.75)(0.2)(-1.0)+(1.0)(0.75)(0.8)(-0.5)$ and $a*b*c$ is equal to $(1.0)(0.75)(0.2)+(1.0)(0.75)(0.8)$. If the bid included only a jacket with only the attribute of price specified, the resulting degree of satisfaction value is −0.6. This value can be directly fuzzified again to describe a degree of satisfaction in a linguistic manner. For example, −0.6 could be expressed as near bad.

In one embodiment of the invention, evaluation engine 102 compares quantitative degree of satisfaction values of the bids received in response to the bid invitation. In the example of the clothing bid illustrated in FIG. 10 is the exemplary bid of one bidder. However, other bidders may also respond to the clothing bid invitation. Evaluation engine 102 computes the quantitative degree of satisfaction values of the bids submitted by these other bidders in the manner set forth herein. Evaluation engine then compares the quantitative degree of satisfaction values of the bids and then provides the prospective purchaser a ranking showing the degree that bids match the prospective purchaser's requests. The prospective purchaser is also notified of the bid that best matches his or her requests. In alternate embodiments, the prospective purchaser manually compares quantitative degree of satisfaction values and/or a device other than evaluation engine 102 compares quantitative degree of satisfaction values. The evaluation engine 102 may also provide a linguistic result. For example, if the result is 0.5, evaluation engine 102 may report to the prospective purchaser that the bid is good. If the result is 0.6, evaluation engine 102 may report that the bid result has contributions to good and very good. Thus, if, for example, a prospective purchaser receives a single bid responding to a bid evaluation with a degree of satisfaction value of 0.5, the prospective purchaser need not try to cross-reference 0.5 to some other information to understand whether the bid met the request. The prospective purchaser quickly understands that the bid is good and can sign a contract.

Figure 13:
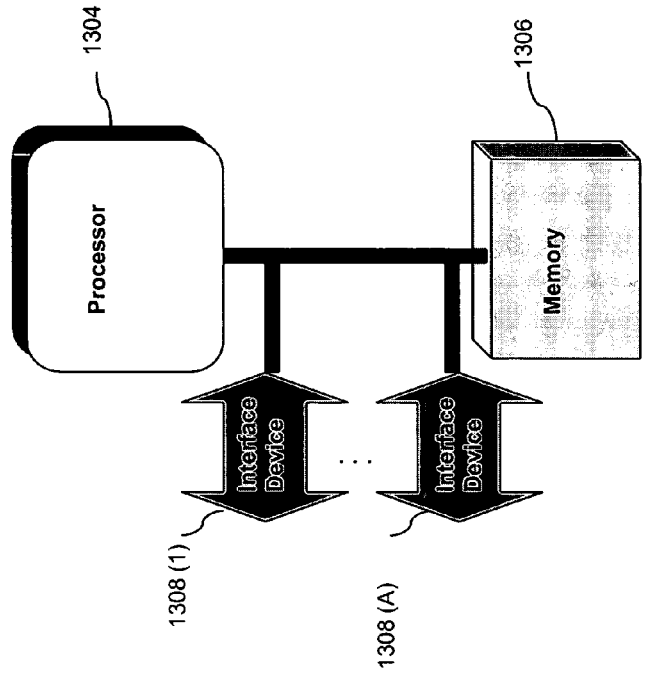
FIG. 13 shows a structure of a evaluation engine according to one embodiment of the invention.

FIG. 13 depicts a structure of a user interface 106 according to one embodiment of the invention. User interface 106 includes processor 1304, memory 1306, and interface devices 1308 (1)-1308 (A). User interface 106 includes processor 1304, memory 1306, and interface devices 1308 (1)-1308 (A). Processor 1304 is connected to memory 1304. Processor 1304 is also connected to interface devices 1308 (1)-1308(A). These connections are direct or via other internal electronic circuitry or components.

Processor 1304 is a programmable processor that executes instructions residing in memory 1306 to receive and send data via interface devices 1308(1)-1308(A). The instructions may perform the operations of the evaluation engine 102 described herein. The term programmable processor as used herein is any programmable microprocessor or processor or combination of microprocessors or processors that can operate on digital data, which may be special or general purpose processors coupled to receive data and instructions from, and to transmit data and instructions to, a machine-readable medium. According to one embodiment of the present invention processor 1304 is an Intel microprocessor.

Memory 1306 is a machine-readable medium that stores data that is processed by processor 1304. The term machine-readable medium as used herein is any addressable storage device that stores digital data including any computer program product, apparatus and/or device (e.g., a random access memory (RAM), read only memory (ROM), magnetic disc, optical disc, programmable logic device (PLD), tape, or any combination of these devices). This may include external machine-readable mediums that are connected to processor 1304 via one or more interface devices 1308(1)-1308 (A).

Interface devices 1308 (1)-1308 (A) are interfaces that receive and/or send digital data to and from an external device. Interfaces as used herein are any point of access to an external device where digital data is received or sent, including ports, buffers, queues, subsets thereof, or any other interface to an external device.

Various implementations of the systems and techniques described here can be realized in any processing systems and/or digital electronic circuitry, integrated circuitry, specially designed ASICs (application specific integrated circuits), computer hardware, firmware, software, and/or combinations thereof. There various implementations can include computer code.

A number of embodiments of the invention have been described. Nevertheless, it will be understood that various modifications may be made without departing from the spirit and scope of the invention.

What is claimed is:

1. A computer-implemented method for generating a bid invitation document and evaluating bids received, comprising:

presenting a query on a display device of a bidding system to a prospective purchaser;

receiving a first selection by the prospective purchaser from the query, the first selection identifying a desired item and a first linguistic term describing a degree of importance assigned to the desired item;

receiving a second selection identifying an attribute of said desired item from the query, the second selection also identifying a second linguistic term describing a degree of importance assigned to the attribute;

receiving a third selection identifying a first value for said attribute, the third selection also identifying a third linguistic term describing a degree of satisfaction assigned to the first value for the attribute;

generating, by a processing server of the bidding system, said bid invitation document using responses to the queries and the selections;

electronically submitting said bid invitation document to prospective suppliers to notify said suppliers of the opportunity to submit a bid responsive to said bid invitation document; and upon receipt of a bid,
retrieving each attribute from the bid,
determining whether the retrieved attribute is a discrete attribute or a continuous attribute, the discrete attribute being associated with a discrete quantitative value and the continuous attribute being associated with two closest discrete values,
for a discrete attribute, retrieving the discrete quantitative value associated with the discrete attribute,
for a continuous attribute, calculating a quantitative value by calculating contribution of the closest discrete quantitative values associated with the continuous attribute;
generating a quantitative degree of satisfaction value for the bid, the quantitative degree of satisfaction value of the bid being computed using a weighted method that takes account of a defuzzified weight for importance of the desired item, a defuzzified weight for the attribute of the desired item, and the discrete quantitative value for a discrete attribute or the calculated quantitative for a continuous attribute; and
generating a linguistic result to be presented to the prospective purchaser, the linguistic result being based on the quantitative degree of satisfaction value.

2. The method of claim 1, further comprising:
querying said prospective purchaser to identify a second value of said attribute, including providing said prospective purchaser with a second set of degree of satisfaction fuzzy variables to select a second degree of satisfaction to describe said second value; and
generating a numerical value representing a third degree of satisfaction to describe a system generated possible value using said first degree of satisfaction and said second degree of satisfaction.

3. The method of claim 1, wherein said importance fuzzy variables comprise not important, not so important, medium, important and very important.

4. The method of claim 1, wherein said degree of satisfaction fuzzy variables comprise very bad, bad, medium, good, and very good.

5. The method of claim 1, further comprising ranking the quantitative degree of satisfaction values value for the evaluated bid with other evaluated bid.

6. The method of claim 1 wherein said prospective purchaser can modify a first set of linguistic terms that the first and second linguistic terms are selected from and a second set of linguistic terms that the third linguistic term is selected from.

7. A system for obtaining bids, comprising:
a processor;
a memory coupled to said processor; and
a bid invitation generator residing in said memory and executed by said processor, said bid invitation generator comprising:
a graphical user interface generator for generating a graphical user interface having controls to:
receive a first selection by the prospective purchaser, the first selection identifying a desired item and a first linguistic term describing a degree of importance assigned to the desired item;
receive a second selection identifying an attribute of the desired item, the second selection also identifying a second linguistic term describing a degree of importance assigned to the attribute;
receive a third selection identifying a first value for the attribute, the third selection also indentifying a third linguistic term describing a degree of satisfaction assigned to the first value for the attribute;
a bid invitation generator for generating a bid invitation for potential bidders using said input from said user and for storing at least one selection of one of said degrees of satisfaction associated with said bid invitation; and
a bid evaluation engine, upon receipt of a bid, being adapted to:
retrieve each attribute from the bid,
determine whether the retrieved attribute is a discrete attribute or a continuous attribute, the discrete attribute being associated with a discrete quantitative value and the continuous attribute being associated with two closest discrete values,
for a discrete attribute, retrieve a fuzzy the discrete quantitative value associated with the discrete attribute,
for a continuous attribute, calculate a quantitative value by calculating contribution of the closest discrete quantitative values associated with the continuous attribute;
generate a quantitative degree of satisfaction value for the bid, the quantitative degree of satisfaction value being computed using a weighted method that takes account of a defuzzified weight for importance of the desired item, a defuzzified weight for the attribute of the desired item, and the discrete quantitative value for a discrete attribute or the calculated quantitative for a continuous attribute; and
translate the quantitative degree of satisfaction value to a linguistic expression to be presented to the prospective purchaser, the linguistic express being easily understood by, the prospective purchaser.

8. The system of claim 7, wherein said bid evaluation engine ranks said quantitative value with other quantitative values obtained by evaluating other bids.

9. Computer readable medium storing thereon program instructions that, when executed, cause an executing device to:
present a query on a display device of a bidding system to a prospective purchaser;
receive a first selection by the prospective purchaser from the query, the first selection identifying a desired item and a first linguistic term describing a degree of importance assigned to the desired item;
receive a second selection identifying an attribute of said desired item from the query, the second selection also identifying a second linguistic term describing a degree of importance assigned to the attribute;
receive a third selection identifying a first value for said attribute, the third selection also indentifying a third linguistic term describing a degree of satisfaction assigned to the first value for the attribute;
generate, by a processing server of the bidding system, said bid invitation document using responses to the queries and the selections;
electronically submit said bid invitation document to prospective suppliers to notify said suppliers of the opportunity to submit a bid responsive to said bid invitation document; and
upon receipt of a bid,
retrieve each attribute from the bid,
determine whether the retrieved attribute is a discrete attribute or a continuous attribute, the discrete attribute being associated with a discrete quantitative value and the continuous attribute being associated with two closest discrete values, for a discrete attribute, retrieve the discrete quantitative fuzzy value associated with the discrete attribute, for a continuous attribute, calculate a quantitative value by calculating contribution of the closest discrete quantitative values associated with the continuous attribute;

generate a quantitative degree of satisfaction value for the bid, the quantitative degree of satisfaction value of the bid being computed using a weighted method that takes account of a defuzzified weight for importance of the desired item, a defuzzified weight for the attribute of the desired item, and the discrete quantitative value for a discrete attribute or the calculated quantitative for a continuous attribute; and generate a linguistic result to be presented to the prospective purchaser, the linguistic result being based on the quantitative degree of satisfaction value.

10. The computer readable medium of claim 9, further comprising instructions that cause the executing device to:

query said prospective purchaser to identify a second value of said attribute, including providing said prospective purchaser with a second set of degree of satisfaction fuzzy variables to select a second degree to describe said second value; and generate a numerical value representing a third degree of satisfaction to describe a system generated possible value using said first degree of satisfaction and said second degree of satisfaction.

11. The computer readable medium of claim 9, wherein said importance fuzzy variables comprise not important, not so important, medium, important and very important.

12. The computer readable medium of claim 9, wherein said degree of satisfaction fuzzy variables comprise very bad, bad, medium, good, and very good.

13. The computer readable medium of claim 9, further comprising ranking the quantitative degree of satisfaction value for the evaluated bid with other evaluated bids.

14. The computer readable medium of claim 9, wherein said prospective purchaser can modify a first set of linguistic terms that the first and second linguistic terms are selected from and a second set of linguistic terms that the third linguistic term is selected from.

* * * * *